United States Patent
Qu et al.

(10) Patent No.: US 11,493,148 B2
(45) Date of Patent: Nov. 8, 2022

(54) FLUID MICRO-INJECTION DEVICE AND FLOW CHANNEL ASSEMBLY

(71) Applicant: CHANGZHOU MINGSEAL ROBOT TECHNOLOGY CO., LTD., Changzhou (CN)

(72) Inventors: Dongsheng Qu, Changzhou (CN); Jijiang Min, Changzhou (CN); Pei Sun, Changzhou (CN); Yangyang Mao, Changzhou (CN); Fuliang Gao, Changzhou (CN)

(73) Assignee: CHANGZHOU MINGSEAL ROBOT TECHNOLOGY CO., LTD., Changzhou (CN)

( * ) Notice: Subject to any disclaimer, the term of this patent is extended or adjusted under 35 U.S.C. 154(b) by 156 days.

(21) Appl. No.: 16/612,056

(22) PCT Filed: Jan. 22, 2018

(86) PCT No.: PCT/CN2018/073612
§ 371 (c)(1),
(2) Date: Nov. 8, 2019

(87) PCT Pub. No.: WO2019/095555
PCT Pub. Date: May 23, 2019

(65) Prior Publication Data
US 2020/0063894 A1    Feb. 27, 2020

(30) Foreign Application Priority Data
Nov. 15, 2017    (CN) .......................... 201721525130.2

(51) Int. Cl.
*F16K 3/02*    (2006.01)
*F16K 99/00*    (2006.01)
(Continued)

(52) U.S. Cl.
CPC .......... *F16K 99/0005* (2013.01); *B05B 15/65* (2018.02); *F16K 3/0272* (2013.01); *F16K 31/58* (2013.01)

(58) Field of Classification Search
CPC .... F16K 99/0005; F16K 3/0272; F16K 31/58; B05B 1/3013; B05B 1/10; B05B 1/30;
(Continued)

(56) References Cited

U.S. PATENT DOCUMENTS 3,993,247 A * 11/1976 Tyler ...................... B05B 1/3093
137/554
4,131,236 A * 12/1978 Saunders ................. D06H 7/22
239/596
(Continued)

FOREIGN PATENT DOCUMENTS

CN    101844116    9/2010
CN    205436061    8/2016
(Continued)

OTHER PUBLICATIONS

Machine translation of WO2012050403 (Lee) Published Apr. 19, 2012; Accessed Jun. 15, 2021 (Year: 2012).*
(Continued)

*Primary Examiner* — Umashankar Venkatesan
*Assistant Examiner* — Andrew J Rost
(74) *Attorney, Agent, or Firm* — Grossman, Tucker, Perreault & Pfleger, PLLC

(57) ABSTRACT

A flow channel assembly (200) of a fluid micro-injection device has a fluid seat (210), a nozzle mounting plate (240), a nozzle (220), a nozzle platen (250) and a fluid supply joint (230). The nozzle (220) is connected to the fluid seat (210) by the nozzle mounting plate (240). The nozzle platen (250) is connected with the nozzle mounting plate (240) to secure the nozzle (220). The fluid supply joint (230) and the fluid
(Continued)

seat (210) are connected to control the fluid flowing to the nozzle (220).

12 Claims, 4 Drawing Sheets

(51) Int. Cl.
*F16K 31/58* (2006.01)
*B05B 15/65* (2018.01)

(58) Field of Classification Search
CPC ......... B05B 15/50; B05B 15/65; B05B 15/14; B05B 1/3046
See application file for complete search history.

(56) References Cited

U.S. PATENT DOCUMENTS

| | | | | |
|---|---|---|---|---|
| 4,647,013 | A * | 3/1987 | Giachino | B41J 2/17596 239/102.2 |
| 7,837,235 | B2 * | 11/2010 | Geser | B05B 15/18 285/332.2 |
| 9,091,472 | B2 * | 7/2015 | Dziubasik | B05B 1/00 |
| 9,302,278 | B2 * | 4/2016 | Huang | B05B 7/2405 |
| 2005/0284957 | A1 * | 12/2005 | Haruch | B05B 7/10 239/290 |
| 2007/0102539 | A1 * | 5/2007 | Riney | B05B 7/0807 239/296 |
| 2007/0235564 | A1 * | 10/2007 | Whittaker | B05B 15/18 239/487 |
| 2015/0114999 | A1 * | 4/2015 | Lanier | B05B 15/5225 222/559 |
| 2016/0325294 | A1 * | 11/2016 | MacIndoe | B05B 1/32 |

FOREIGN PATENT DOCUMENTS

| | | | | |
|---|---|---|---|---|
| CN | 106513196 | | 3/2017 | |
| CN | 207430585 | | 6/2018 | |
| GB | 883459 | A * | 11/1961 | ............ F16K 31/58 |
| KR | 10-2014-0080365 | | 6/2014 | |
| WO | 2012/050403 | | 4/2012 | |

OTHER PUBLICATIONS

International Search Report from corresponding PCT Appln. No. PCT/CN2018/073612, dated Jul. 30, 2018.
Written Opinion from corresponding PCT Appln. No. PCT/CN2018/073612, dated Jul. 30, 2018.

* cited by examiner

FLUID MICRO-INJECTION DEVICE AND FLOW CHANNEL ASSEMBLY

FIELD

The present disclosure relates to a flow channel assembly for a fluid micro-injection device and a fluid micro-injection device having the flow channel assembly.

BACKGROUND

The fluid flow channel of the existing fluid micro-injection device may have problems of closed flow channels, cumbersome cleaning, and complex assembly/disassembly of related accessories, resulting in low assembly efficiency, inconvenient assembly/disassembly or cleaning with high maintenance cost, and the assembly of the device may be time-consuming.

SUMMARY

The present disclosure aims to solve at least one of technical problems existing in the art.

To this end, the present disclosure may provide a flow channel assembly of a fluid micro-injection device that may be easy for cleaning and simple for assembly.

The present disclosure also provides a fluid micro-injecting device having the above-described flow channel assembly.

According to an embodiment of the first aspect of the present disclosure, a flow channel assembly of a fluid micro-injection device may comprise a fluid seat defining a fluid chamber and a flow channel in communication with the fluid chamber therein; a nozzle mounting plate disposed under the fluid seat and provided with a through hole communicating with the fluid chamber; a nozzle disposed on the nozzle mounting plate and in communication with the through hole, a movable element of the fluid micro-injection device movably passing through the fluid chamber and the through hole to open and close the nozzle; a nozzle platen disposed under the nozzle mounting plate and connected to the nozzle mounting plate to fix the nozzle; and a fluid supply joint communicating with the flow channel to provide fluid to the nozzle through the flow channel and the fluid chamber.

As for the flow channel assembly of the fluid micro-injection device according to the embodiment of the present disclosure, the fluid chamber and the flow channel may be defined in the fluid seat, a nozzle mounting plate may be disposed below the fluid seat, a nozzle platen may be disposed below the nozzle mounting plate to secure the nozzle, the nozzle may be opened and closed by the movable element, and the fluid supply joint may communicate with the fluid chamber through the flow channel. The flow channel assembly has a simple structure, convenient for disassembly and assembly, with low maintenance cost.

According to one embodiment of the present disclosure, an upper surface of the nozzle mounting plate may be provided with a positioning cylinder, an upper surface of the nozzle mounting plate may abut against a lower surface of the fluid seat and the positioning cylinder may extend into the fluid cavity, the through hole may penetrate through the positioning cylinder.

According to one embodiment of the present disclosure, an outer circumference of the positioning cylinder may be provided with a sealing recess extending in a circumferential direction thereof, and the flow channel assembly may further include a sealing ring disposed in the sealing recess and abut against the fluid seat.

According to one embodiment of the present disclosure, a lower surface of the nozzle mounting plate may be provided with a positioning boss, the positioning boss may be provided with a mounting groove therein, and the mounting groove may be in communication with the through hole and the nozzle may be mounted in the mounting groove.

According to one embodiment of the present disclosure, the mounting groove may be formed in a circular shape and disposed coaxially with the through hole and the fluid chamber.

According to one embodiment of the present disclosure, the nozzle platen may be provided with a positioning groove corresponding to a position of the mounting groove, at least a part of the nozzle may be mounted in the positioning groove, and the nozzle platen may be provided with an opening communicating with the positioning groove to inject liquid in the nozzle.

According to one embodiment of the present disclosure, the positioning groove and the opening may be formed in circular shapes and disposed coaxially with the through hole and the fluid chamber respectively.

According to one embodiment of the present disclosure, the nozzle platen and the nozzle mounting plate may be respectively connected with the fluid seat by screws.

According to one embodiment of the present disclosure, a cross section of the through hole may be formed as a flower-shaped cross section.

According to an embodiment of the second aspect of the present disclosure, a fluid micro-injecting device may include the flow channel assembly of the fluid micro-injecting device according to the above described embodiment(s).

The additional aspects and advantages of the present disclosure will be set forth and apparent in part in the following description or be learned by practicing the present disclosure.

BRIEF DESCRIPTION OF THE DRAWINGS

The above and/or additional aspects and advantages of the present disclosure will become apparent and readily understood from the following attached drawings, wherein.

DRAWING REFERENCE SIGNS

Figure 1:
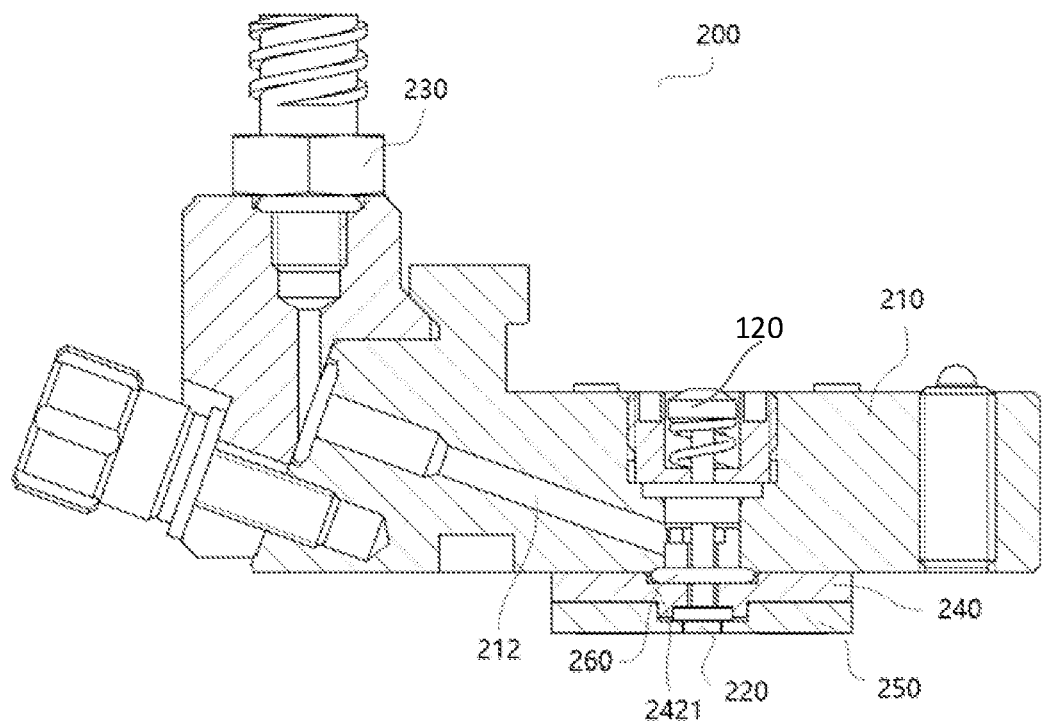
FIG. 1 is a schematic view showing a structure of a flow channel assembly of a fluid micro-injection device according to an embodiment of the present disclosure.

Fluid micro-injection device 300;
Flow channel assembly 200;
Fluid seat 210; Fluid chamber 211; Flow channel 212;
Nozzle 220; Fluid supply joint 230;
Nozzle mounting plate 240; Through hole 241;
Positioning cylinder 242; Sealing recess 2421;
Positioning boss 243; Mounting groove 2431;
Nozzle platen 250; Positioning groove 251; Opening 252;
Inner mounting plane 253;
Sealing ring 260.

DETAILED DESCRIPTION

Embodiments of the present disclosure will be described hereinafter in detail. Examples of the embodiments may be illustrated in the drawings, wherein the same or similar reference numerals refer to the same or similar elements or elements having the same or similar functions. The embodiments described below with reference to the accompanying drawings may be illustrative to explain the present disclosure and should not be construed as being limited to the present disclosure.

In the description of the present disclosure, it should be understood that terms "center", "longitudinal", "transverse", "length", "width", "thickness", "upper", "lower", "front", "back", "left", "right", "vertical", "horizontal", "top", "bottom", "inside", "outside", "clockwise", "counterclockwise", "axial", "radial", "circumferential" and the like refer to orientation and positional relationship based on the orientation or positional relationship shown in the drawings. Those merely intend to describe the present disclosure and simplify description, and do not indicate or imply that the indicated devices or components must be constructed and operated in a particular orientation. Therefore, the above cannot be construed as being limited to the present disclosure. Furthermore, features defining "first" and "second" may explicitly or implicitly include one or more features. In the description of the present disclosure, "plurality" means two or more, unless otherwise stated.

In the description of the present disclosure, it should be noted that the terms "installation", "attached", and "connected" should be understood in a broad manner, and for example, the terms may refer to be fixed or detachable or integrally connected; mechanical or electrical connection; directly connected, or indirectly connected through an intermediate medium, or internal communication of two components, unless otherwise explicitly stated or defined. The specific meaning of the above terms in the present disclosure can be understood in a specific case by those skilled in the art.

A flow channel assembly 200 for a fluid micro-injection device according to an embodiment of the present disclosure will be specifically described below with reference to the accompanying drawings.

As shown in FIGS. 1-6, the flow channel assembly 200 of the fluid micro-injection device according to the embodiment of the present disclosure may include a fluid seat 210, a nozzle mounting plate 240, a nozzle 220, a nozzle platen 250 and a fluid supply joint 230.

Specifically, the fluid seat 210 may define a fluid chamber 211 and a flow channel 212 communicating with the fluid chamber 211 therein. The nozzle mounting plate 240 may be disposed under the fluid seat 210 and provided with a through hole 241 communicating with the fluid chamber 211. The nozzle 220 may be disposed on the nozzle mounting plate 240 and communicate with the through hole 241. The movable element of the fluid micro-injection device may movably pass through the fluid chamber 211 and the through hole 241 to open or close the nozzle 220. The nozzle platen 250 may be disposed below the nozzle mounting plate 240 and connected with the nozzle mounting plate 240 to secure the nozzle 220. The fluid supply joint 230 may communicate with the flow channel 212 to provide fluid to the nozzle 220 through the flow channel 212 and the fluid chamber 211.

Figure 2:
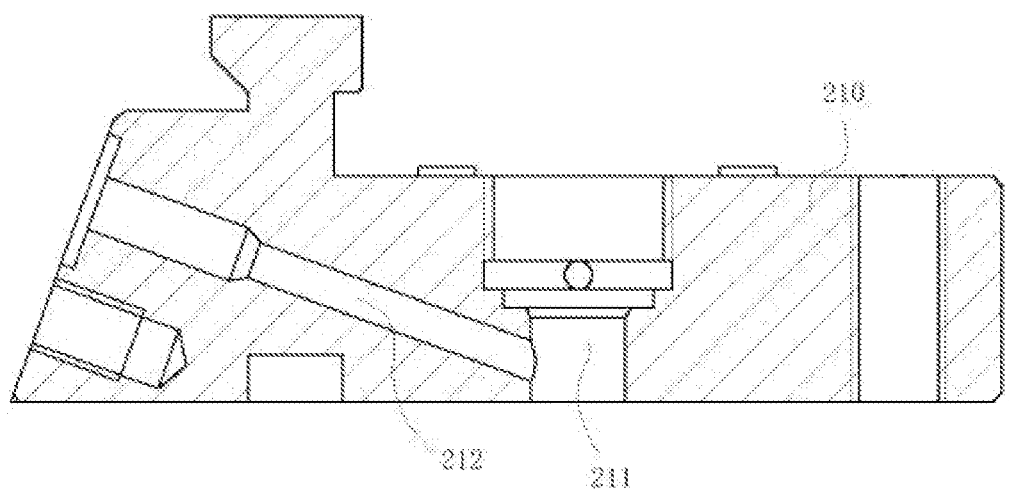
FIG. 2 is a cross-sectional view of a fluid seat of the flow channel assembly of the fluid micro-injection device according to an embodiment of the present disclosure.

In other words, the flow channel assembly 200 may mainly comprise a fluid seat 210, a nozzle mounting plate 240 disposed below the fluid seat 210, a nozzle 220 disposed on the nozzle mounting plate 240, a nozzle platen or pressing plate 250 disposed under the nozzle mounting plate 240, and a fluid supply joint 230 which may be connected with the fluid seat 210 to provide fluid to the fluid seat 210, as shown in FIGS. 1 and 2. The fluid seat 210 may be provided with the fluid chamber 211 and the flow channel 212. The flow channel 212 may be in communication with the fluid chamber 211. The nozzle mounting plate 240 may be provided with the through hole 241. The fluid chamber 211 may be in communication with the through hole 241. The nozzle mounting plate 240 may be provided with the nozzle 220 communicating with the through hole 241. The movable element of the fluid micro-injection device may movably pass through the fluid chamber 211 and the through hole 241 to open or close the nozzle 220 accordingly. The nozzle platen 250 may be disposed under the nozzle mounting plate 240. The nozzle platen 250 may be connected with the nozzle mounting plate 240 and fix the nozzle 220. The fluid supply joint 230 may be disposed on the fluid seat 210 and in communication with the flow channel 212. The fluid supply joint 230 may be adapted to communicate with a fluid storage container to pass the fluid through the flow channel 212 and the fluid chamber 211 to the nozzle.

It should be noted that the fluid micro-injection device according to the embodiment of the present disclosure may comprise an execution system and a flow channel assembly 200. The execution system may be mainly used to control operation of the movable element. The flow channel assembly 200 may be provided with a flow channel 212 communicating with a fluid storage means. When the execution system may cooperate with the flow channel assembly 200, the execution system may open or close a nozzle 220 of the flow channel assembly 200 by controlling the movable element 120 and the displacement thereof. Thus, the fluid micro-injection device may be opened or closed, or the injecting effect thereof may be adjusted accordingly. The fluid seat 210 of the flow channel assembly 200 may be provided with a plurality of fitting holes adapted to be assembled with the execution system. The structure of the execution system may be easily understood and implemented by those skilled in the art and, therefore, will not be described herein in detail.

In view of the above, according to the flow channel assembly 200 of the fluid micro-injection device according to an embodiment of the present disclosure, the fluid chamber 211 and the flow channel 212 may be defined in the fluid seat 210 and the nozzle 220 on the nozzle mounting plate 240 may be opened or closed by the movable element. The fluid supply joint 230 may communicate with the fluid chamber 211 through the flow channel 212. The nozzle mounting plate 240 provided with the nozzle 220 and the nozzle platen 250 for fixing the nozzle 220 may be disposed below the fluid seat 210, thus enabling quick disassembly and assembly of the nozzle 220 during the production process. Thus, the flow channel assembly 200 may have a simple structure, easy for assembly/disassembly with a low maintenance cost.

According to one embodiment of the present disclosure, an upper surface of the nozzle mounting plate 240 may be provided with a positioning cylinder 242. The upper surface of the nozzle mounting plate 240 may abut against a lower surface of the fluid seat 210. The positioning cylinder 242 may extend into the fluid chamber 211. The through hole 241 may penetrate through the positioning cylinder 242.

Specifically, the positioning cylinder 242 may cooperate with the fluid chamber 211 so that the through hole 241 of the nozzle mounting plate 240 may be coaxial with an axis of the fluid chamber 211.

Further, an outer circumference of the positioning cylinder 242 may be provided with a sealing recess 2421 extending in the circumferential direction thereof. The flow channel assembly 200 may further include a sealing ring 260.

Specifically, the sealing ring 260 may be disposed within the sealing recess 2421 and abut against the fluid seat 210. The sealing recess 2421 may fits with the sealing ring 260 to form the fluid chamber 211 into a sealed state.

Figure 3:
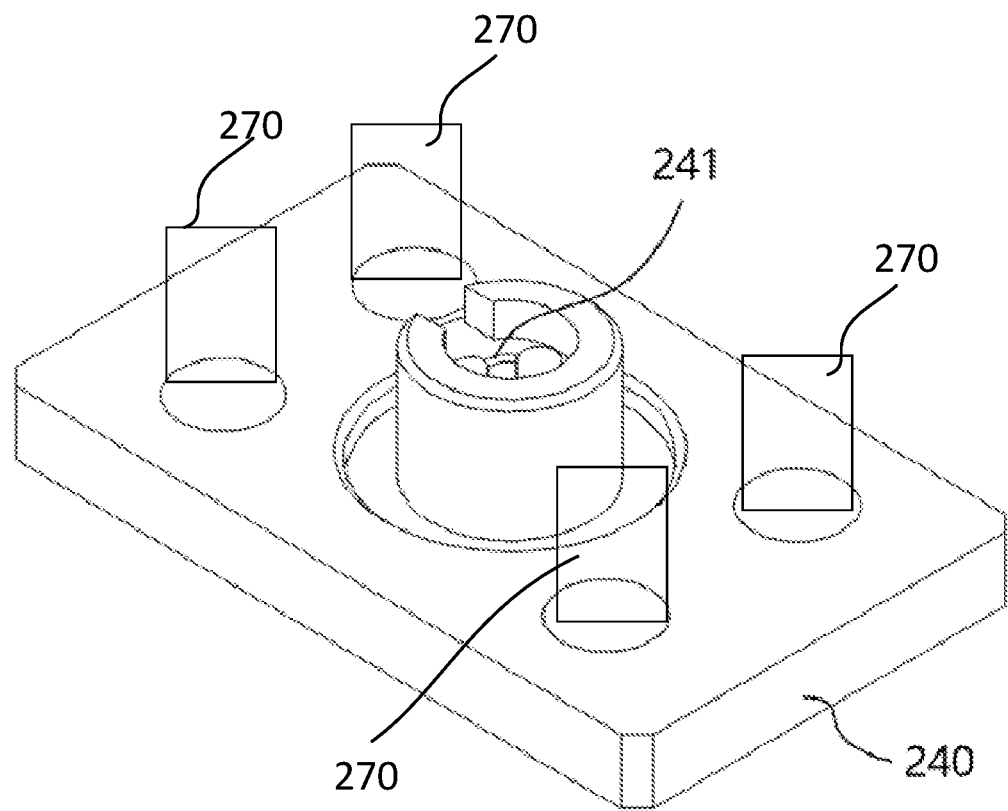
FIG. 3 is a schematic view showing a structure of a nozzle mounting plate of a flow channel assembly of the fluid micro-injection device according to an embodiment of the present disclosure.
Figure 4:
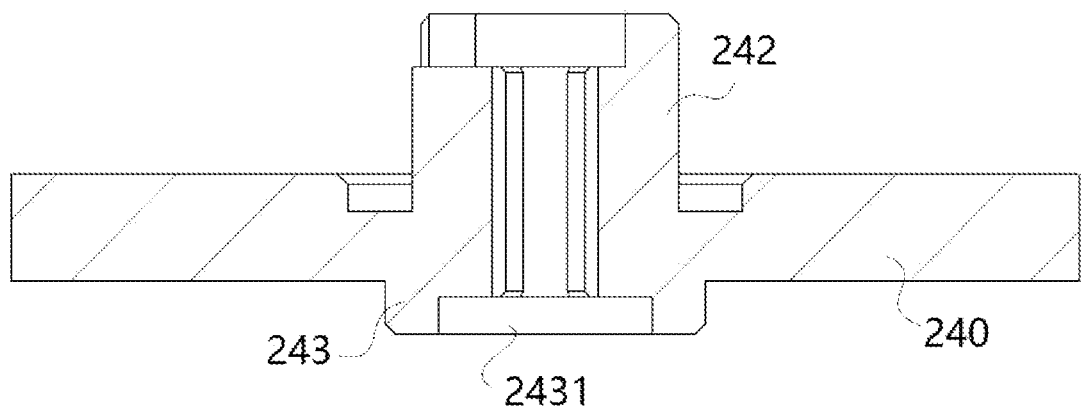
FIG. 4 is a cross-sectional view of a nozzle mounting plate of a flow channel assembly of a fluid micro-injection device according to an embodiment of the present disclosure.

As shown in FIGS. 3 and 4, the lower surface of the nozzle mounting plate 240 may be provided with a positioning boss 243 in some embodiments of the present disclosure. The positioning boss 243 may be provided with a mounting groove 2431 therein which may communicate with the through hole 241. The nozzle 220 may be installed in the mounting groove 2431.

According to an embodiment of the present disclosure, the mounting groove 2431 may be formed in a circular shape and disposed coaxially with the through hole 241 and the fluid chamber 211. The mounting groove 2431 may be coaxial with the positioning cylinder 242 while a bottom surface of the mounting groove 2431 may be perpendicular to an axis of the positioning cylinder 242. After the assembly of the nozzle mounting plate 240 and the nozzle 220, the axis of the nozzle 220 may be coincident with the axis of the movable element, thus bringing the fluid chamber 211 into a sealed state.

Figure 5:
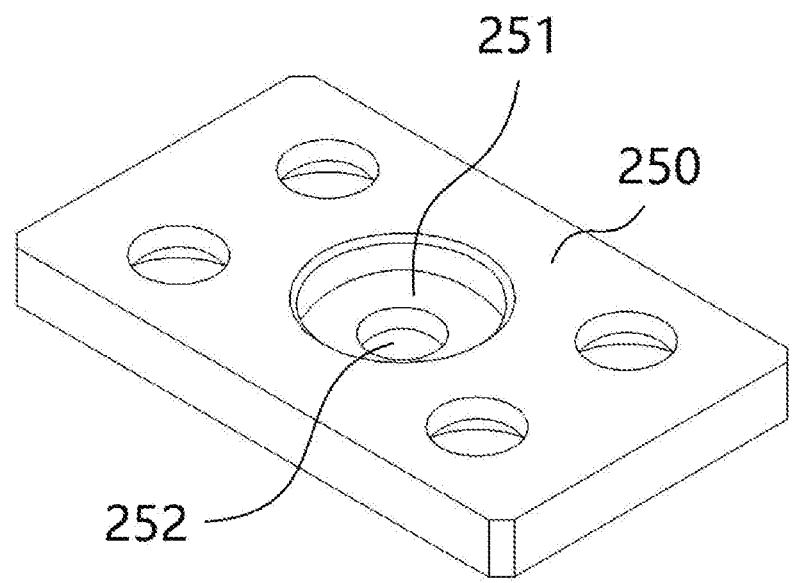
FIG. 5 is a schematic view showing a structure of a nozzle platen of a flow channel assembly of a fluid micro-injection device according to an embodiment of the present disclosure.
Figure 6:
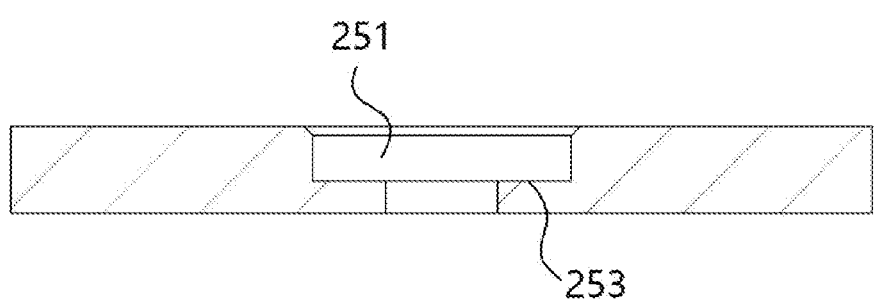
FIG. 6 is a cross-sectional view of a nozzle platen of a flow channel assembly of a fluid micro-injection device according to an embodiment of the present disclosure.
Figure 7:
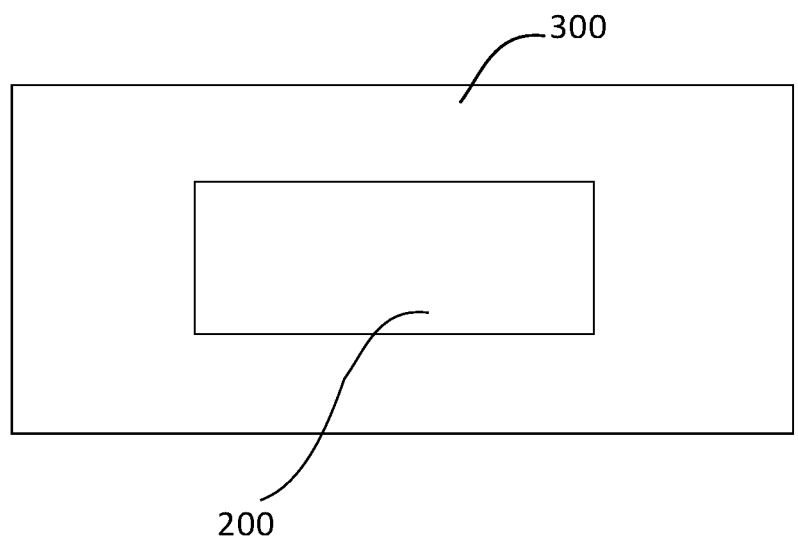
FIG. 7 is a block diagram of a fluid micro-injection device according to an embodiment of the present disclosure.

As shown in FIGS. 5 and 6, the nozzle platen 250 may be provided with a positioning groove 251 corresponding to the position of the mounting groove 2431 according to one embodiment of the present disclosure. At least a part of the nozzle 220 may be installed in the positioning groove 251. The nozzle platen 250 may be provided with an opening 252 communicating with the positioning groove 251 to inject the liquid within the nozzle 220. The nozzle 220 can be fixed between the nozzle platen 250 and the nozzle mounting plate 240 by the positioning groove 251 when the nozzle 220 may be locked tight. The nozzle platen 250 may be further formed with an inner mounting plane 253 thereon. When the nozzle platen 250 may be fitted with the nozzle mounting plate 240, the inner mounting plane 253 may fit with the lower surface of the nozzle 220 so that the upper surface of the nozzle 220 may closely fit with a bottom surface of the mounting groove 2431 of the nozzle mounting plate 240 to obtain a sealed effect.

In some embodiments of the present disclosure, the positioning groove 251 and the opening 252 may be formed in circular shapes and disposed coaxially with the through hole 241 and the fluid chamber 211 respectively.

According to one embodiment of the present disclosure, the nozzle platen 250 and the nozzle mounting plate 240 may be connected to the fluid seat 210 via screws 270 respectively.

According to an embodiment of the present disclosure, a cross section of the through hole 241 may be formed into a flower-shape. The flower-shaped cross section may ensure that the fluid may be output smoothly when the fluid may reach the junction of the movable element and the nozzle 220.

The assembly process and assembly feature of the flow channel assembly 200 of the fluid micro-injection device according to an embodiment of the present disclosure may be specifically described below.

Firstly, the sealing ring 260, the nozzle 220 and the nozzle mounting plate 240 may be assembled together. The nozzle platen 250 may be then pressed against the nozzle mounting plate 240, and screwed to a lower plane of the fluid seat 210 via screws 270 so that the nozzle 220 and the fluid scat 210 may be fixed, and the fluid chamber 211 may be sealed accordingly.

In the specific assembly, the sealing ring 260 may be inserted into the sealing recess 2421 of the nozzle mounting plate 240. The nozzle 220 may be then installed into the mounting groove 2431 of the nozzle mounting plate 240. Next, the nozzle 220 may be pressed by the nozzle platen 250. The nozzle platen 250, the nozzle 220 and the nozzle mounting plate 240 may be screwed into the fluid seat 210 by screws 270 so that an inner tapered surface of the nozzle 220 may be in close contact with a ball head of the movable element. Meanwhile, the sealing ring 260 may be closely attached to the lower surface of the fluid seat 210 to bring the fluid chamber 211 into a sealed state.

A fluid micro-injection device according to an embodiment of the present disclosure includes the flow channel assembly 200 of the fluid micro-injection device according to the above embodiment. The flow channel assembly 200 according to the above embodiment of the present disclosure may have the above-described technical effects. Accordingly, the fluid micro-injection to an embodiment of the present disclosure may also have the corresponding technical effects. That is, assembly/disassembly and cleaning of the device may be convenient.

In the description of the present specification, the description with reference to the terms "one embodiment", "some embodiments", "illustrative embodiment", "example", "specific example", or "some examples", etc. refer to particular features, structures, materials or characteristics described in the embodiments or examples included in at least one embodiment or example of the present disclosure. In the present specification, the schematic representation of the above terms does not necessarily mean the same embodiment or example. Furthermore, described particular features, structures, materials or characteristics may be combined in a suitable manner in any one or more embodiments or examples.

While the embodiments of the present disclosure have been shown and described, the embodiments of the present disclosure may be changed, varied and replaced for those skilled in the art without departing from the spirit and scope of the present disclosure, whereby the scope of the present disclosure may be defined by the claims and their equivalents.

What is claimed is:
1. A flow channel assembly of a fluid micro-injection device, comprising:

a fluid seat defining a fluid chamber and a flow channel in communication with the fluid chamber therein;

a nozzle mounting plate disposed under the fluid seat and provided with a through hole communicating with the fluid chamber;

a nozzle disposed on the nozzle mounting plate and in communication with the through hole, a movable element of the fluid micro-injection device movably passing through the fluid chamber and the through hole to open or close the nozzle;

a nozzle platen disposed entirely under the nozzle mounting plate and connected with the nozzle mounting plate to fix the nozzle; and a fluid supply joint communicating with the flow channel to provide fluid to the nozzle through the flow channel and the fluid chamber.

2. The flow channel assembly according to claim 1, wherein an upper surface of the nozzle mounting plate is provided with a positioning cylinder, an upper surface of the nozzle mounting plate abuts against a lower surface of the fluid seat and the positioning cylinder extends into the fluid cavity, and the through hole penetrates through the positioning cylinder.

3. The flow channel assembly according to claim 2, wherein an outer circumference of the positioning cylinder is provided with a sealing recess extending in a circumferential direction thereof, and the flow channel assembly further includes a sealing ring disposed in the sealing recess and abuts against the fluid seat.

4. A fluid micro-injection device comprising a flow channel assembly of the fluid micro-injecting device according to claim 2.

5. The flow channel assembly according to claim 1, wherein a lower surface of the nozzle mounting plate is provided with a positioning boss, the positioning boss is provided with a mounting groove therein, and the mounting groove is in communication with the through hole and the nozzle is mounted in the mounting groove.

6. The flow channel assembly according to claim 5, wherein the mounting groove is formed in a circular shape and disposed coaxially with the through hole and the fluid chamber.

7. The flow channel assembly according to claim 5, wherein the nozzle platen is provided with a positioning groove corresponding to a position of the mounting groove, at least a part of the nozzle is mounted in the positioning groove, and the nozzle platen is provided with an opening communicating with the positioning groove to inject liquid in the nozzle.

8. The flow channel assembly according to claim 7, wherein the positioning groove and the opening are formed in circular shapes and disposed coaxially with the through hole and the fluid chamber respectively.

9. A fluid micro-injection device comprising a flow channel assembly of the fluid micro-injecting device according to claim 5.

10. The flow channel assembly according to claim 1, wherein the nozzle platen and the nozzle mounting plate are connected with the fluid seat by screws respectively.

11. A fluid micro-injection device comprising a flow channel assembly of the fluid micro-injecting device according to claim 10.

12. A fluid micro-injection device comprising a flow channel assembly of the fluid micro-injecting device according to claim 1.

* * * * *